(12) United States Patent
Gersten et al.

(10) Patent No.: US 12,101,000 B2
(45) Date of Patent: Sep. 24, 2024

(54) ROTOR CARRIER FOR A ROTOR OF AN ELECTRIC MOTOR

(71) Applicant: ZF Friedrichshafen AG, Friedrichshafen (DE)

(72) Inventors: Rayk Gersten, Friedrichshafen (DE); Stefan Spühler, Friedrichshafen (DE); Daniel Meindl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 256 days.

(21) Appl. No.: 17/682,309

(22) Filed: Feb. 28, 2022

(65) Prior Publication Data
US 2022/0311295 A1    Sep. 29, 2022

(30) Foreign Application Priority Data

Mar. 26, 2021   (DE) .................... 10 2021 202 990.6

(51) Int. Cl.
*H02K 1/28*         (2006.01)
(52) U.S. Cl.
CPC ...................................... *H02K 1/28* (2013.01)
(58) Field of Classification Search
CPC .................................... H02K 1/28; H02K 1/30
See application file for complete search history.

(56) References Cited

U.S. PATENT DOCUMENTS 10,158,269 B1 *  12/2018  Kurita ................... F16C 17/026
2011/0278981 A1   11/2011  Utaka et al.
2013/0076199 A1 *  3/2013  Yamagishi ............... H02K 1/28
                                                310/216.121
2022/0224184 A1 *  7/2022  Goos ...................... H02K 15/02
2022/0352773 A1   11/2022  Hara et al.

FOREIGN PATENT DOCUMENTS

| DE | 10 2017 001 987 A1 | 10/2017 |
| DE | 10 2019 112 657 A1 | 2/2019 |
| JP | 2010233291 A | 10/2010 |
| JP | 2014036471 | 3/2015 |
| JP | 2021027799 A | 2/2021 |

OTHER PUBLICATIONS

German Patent Office, German Search Report issued in German Application No. 10 2021 202 990.6 (Dec. 15, 2021).

* cited by examiner

*Primary Examiner* — Thomas Truong
(74) *Attorney, Agent, or Firm* — Finch & Maloney PLLC

(57) ABSTRACT

Disclosed is a rotor carrier for a rotor of an electric machine. The rotor carrier includes a hollow outer shell that includes a bearing area for a rotor lamination stack, the bearing area extending axially along the rotor carrier. The outer shell extends radially outward in a radial dimension that varies along the bearing area in the axial direction of the rotor carrier (101) in such manner that at the axial end sections of the bearing area exhibits no peak contact pressures between the rotor carrier and the rotor lamination stack when the rotor lamination stack is pressed against the bearing area of the rotor carrier. A rotor including the rotor carrier and the rotor lamination stack is also disclosed.

20 Claims, 5 Drawing Sheets

ROTOR CARRIER FOR A ROTOR OF AN ELECTRIC MOTOR

This application claims the benefit of and right of priority under 35 U.S.C. § 119 to German Patent Application no. 10 2021 202 990.6, filed on Mar. 26, 2021, the contents of which are incorporated herein by reference in its entirety.

FIELD OF THE DISCLOSURE

The invention relates to a rotor carrier for a rotor of an electric machine.

BACKGROUND

Pressing a rotor lamination stack against a rotor carrier of an electric machine can give rise to deformations of the rotor carrier and the rotor lamination stack. Owing to the edge rigidity of the rotor carrier, this can produce locally differing high contact pressures. Higher contact pressures give rise to higher circumferential stresses in the individual laminae of the rotor lamination stack, which in turn result in larger deformations.

From US 2013/076199 A1 a rotor for a rotating electric machine is known. The electric machine comprises a rotor shaft mounted to rotate; and a rotor core which has a shaft hole in a central section of a steel lamination stack. The rotor core consisting of a stack of steel sheets is fitted tightly at a circumference of the rotor shaft inserted in the shaft hole and fixed by thermal shrinkage. In a contact area of the rotor shaft which is in contact with an inner circumferential section of the shaft hole, the rotor shaft has a section with a smaller diameter, and this is a position which corresponds to an end area of the rotor core in an axial direction of the rotor core.

SUMMARY

A purpose of the present invention can be regarded as to reduce deformations of a rotor carrier and contact pressures, and deformations in individual laminae of a rotor lamination stack. This objective is achieved by the object of the independent claims. Advantageous embodiments are the object of the subordinate claims, the description that follows, and the figures.

According to the present invention it is proposed to provide an outer contour of a rotor carrier (not a rotor shaft) with a correction in such manner that the correction gives rise to a constant pressure distribution over the whole axial length of the rotor lamination stack at an operational rotation speed. In this context the rotor lamination stack is an external component comprising a cylinder with thin-walled laminae stacked axially one above another. The correction is applied at a thin-walled internal component, the rotor carrier. In that sense, according to a first aspect of the invention a rotor carrier for a rotor of an electric machine is provided. The rotor carrier is a hollow component. The rotor carrier is a thin-walled component. In particular, an outer diameter of the rotor carrier can be many times larger than the wall thickness of the hollow rotor carrier. The rotor carrier is not the rotor shaft, which can be connected to the rotor carrier in order drive it.

In this case an outer lateral shell of the rotor carrier forms a bearing area for a rotor lamination stack of a rotor, the said bearing area extending in an axial direction of the rotor carrier. According to the invention, it is in particular provided that the extension of the outer lateral shell varies in a radial direction of the rotor carrier along the bearing area in the axial direction of the rotor carrier, in such manner that in the axial end sections of the bearing area no peak values of a contact pressure between the rotor carrier and the rotor lamination stack are produced when the rotor lamination stack is pressed against the bearing area of the rotor carrier. The radial shape of the bearing area formed by the outer lateral shell is thus adapted to the contact pressures produced along the axial direction in such manner that peaks no longer occur in the axial edge areas of the rotor carrier, but rather, they are now equalized within the bearing area as a whole in such manner that no pressure peaks occur, particularly in the axial end areas of the bearing area. In that way deformations of the rotor carrier and the rotor lamination stack can be substantially reduced when the rotor lamination stack is pressed against the rotor carrier.

The radial variation of the outer lateral shell in the region of the bearing area represents a correction of the outer contour of the rotor carrier, which can be produced for example by machining the rotor carrier. For example, the outer lateral shell of the rotor carrier can be machined by turning on a lathe, so that the outer diameter of the rotor carrier in the axial end sections is reduced. In this connection, in particular a CNC lathe-turning process can be used, whereby particularly small and finely gradated material removal can be carried out.

The correction of the rotor carrier can in particular be selected in such manner that at operational rotation speed it brings about a constant distribution of pressure over the axial length of the rotor lamination stack. In that sense, in an embodiment, the extension of the outer lateral shell in the radial direction of the rotor carrier varies along the bearing area in the axial direction of the rotor carrier, in such manner that within the bearing area a profile of the contact pressure along the axial direction is constant when the rotor lamination stack is pressed against the rotor carrier in the bearing area, and when the rotor carrier is rotating at a specified operational rotation speed.

In particular the circumferential stress in the rotor carrier can be reduced by cambering, so that effects caused by pressing the lamination stack against the rotor carrier are counteracted particularly effectively. In that sense, in a further embodiment the bearing area is cambered.

The bearing area can comprise a first axial end section, a second axial end section, and a central section arranged between the first and second axial end sections, wherein the central section extends in the radial direction farther outward than do the first and second axial end sections. This different width extension of the outer lateral shell can in particular be designed such that a material thickness of the rotor carrier within the central section of the bearing area is greater than it is within its two axial end sections. The smaller material thickness within the axial end sections is not evident radially on the inside, but only radially on the outside of the rotor carrier. The smaller material thickness hardly weakens the rotor carrier at its axial end sections, but instead significantly reduces the contact pressures in the said axial end sections. Since the outer lateral shell within the axial end sections extends outward less far in the radial direction than it does within the central section of the bearing area, the rigidity of the rotor in the two axial end sections is reduced. This avoids the possibility that, owing to the pressure of the rotor lamination stack, a pressure will be produced in the two axial end sections which is high enough to deform the rotor lamination stack plastically in the area of the axial end sections. Thus, it is ensured that even at high rotation speeds such as the operational rotation speed (the maximum permitted rotation speed), the rotor lamination stack will at all times maintain the contact with the rotor carrier required for transmitting the torque.

In this connection it is particularly advantageous, especially from the standpoint of production technology, for the transitions between the radially differing sections to be formed with radii. The radii can be produced precisely and simply by CNC lathe-turning. In that sense, in a further embodiment it is provided that the extension of the outer lateral shell in the radial direction increases along a first radius from the first axial end section toward the central section, while the extension of the outer lateral shell in the radial direction increases along a second radius from the second axial end section toward the central section.

It has been found that a particularly uniform contact pressure can be produced if the extension of the outer lateral shell in the central section is greater in the radial direction by up to 1 mm or up to 0.1 mm than in the first axial end section and/or than in the second axial end section. In particular, the extension of the outer lateral shell in the radial direction in the central section can be 0.02 mm greater than in the first axial end section and than in the second axial end section, by which means different contact pressure levels and deformations can be particularly effectively avoided.

So far as the extension of the sections in the axial direction is concerned, it has been found particularly advantageous for the first axial end section and the second axial end section each to extend 20 mm in the axial direction of the rotor carrier. The central section can in that case extend in particular 80 mm in the axial direction of the rotor carrier.

According to a second aspect of the invention, a rotor for an electric machine is provided. The rotor comprises a rotor carrier in accordance with the first aspect of the invention and a rotor lamination stack. In the bearing area the rotor lamination stack is pressed against the outer lateral shell of the rotor carrier. According to a third aspect of the invention an electric machine can comprise a rotor in accordance with the second aspect of the invention. According to a fourth aspect of the invention, a drive-train for a motor vehicle can comprise an electric machine in accordance with the third aspect of the invention. According to a fifth aspect of the invention, a motor vehicle can comprise a drive-train in accordance with the fourth aspect of the invention.

BRIEF DESCRIPTION OF THE DRAWINGS

Below, example embodiments of the invention are explained in greater detail with reference to the schematic drawing, wherein the same or similar elements are denoted by the same indexes. The drawing shows.

DETAILED DESCRIPTION

Figure 1:
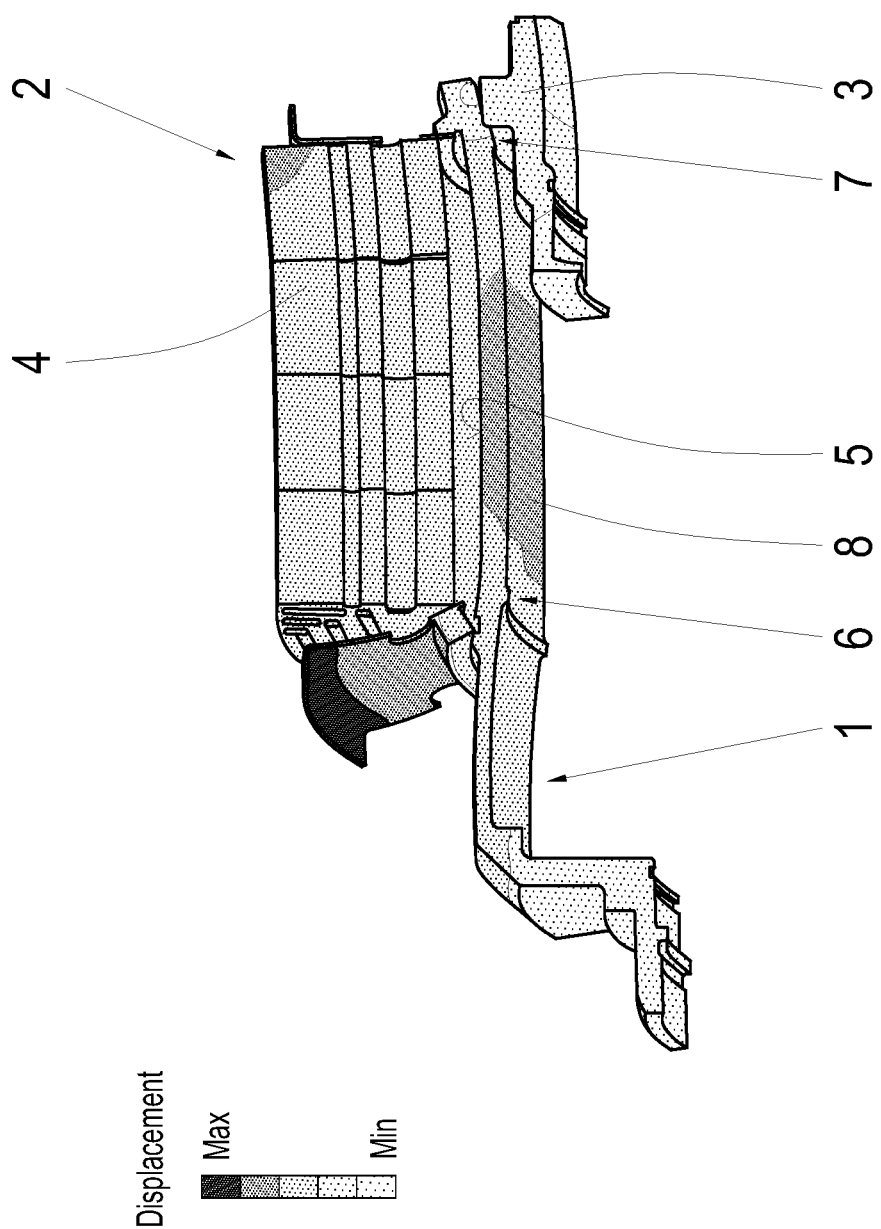
FIG. 1: A longitudinal sectioned representation of part of a rotor carrier, against which a rotor lamination stack is pressed.

FIG. 1 shows a rotor carrier 1 for a partially represented rotor 2 of an electric machine, no more of which is shown.

The electric machine can in particular be designed to be used in a drive-train of a motor vehicle and to drive the motor vehicle. The rotor carrier 1 can be made to rotate by a rotor shaft (not shown). In the area of an axial end face of the rotor carrier 1 there is arranged a bearing plate 3. On its outer periphery the rotor carrier 1 supports a rotor lamination stack 4. The rotor carrier 1 has a bearing area 5 against which the rotor lamination stack 4 is pressed in a rotationally fixed manner. The pressing of the rotor lamination stack 4 against the bearing area 5 leads to contact pressures that act upon the bearing area 5 of the rotor carrier 1.

Figure 2:
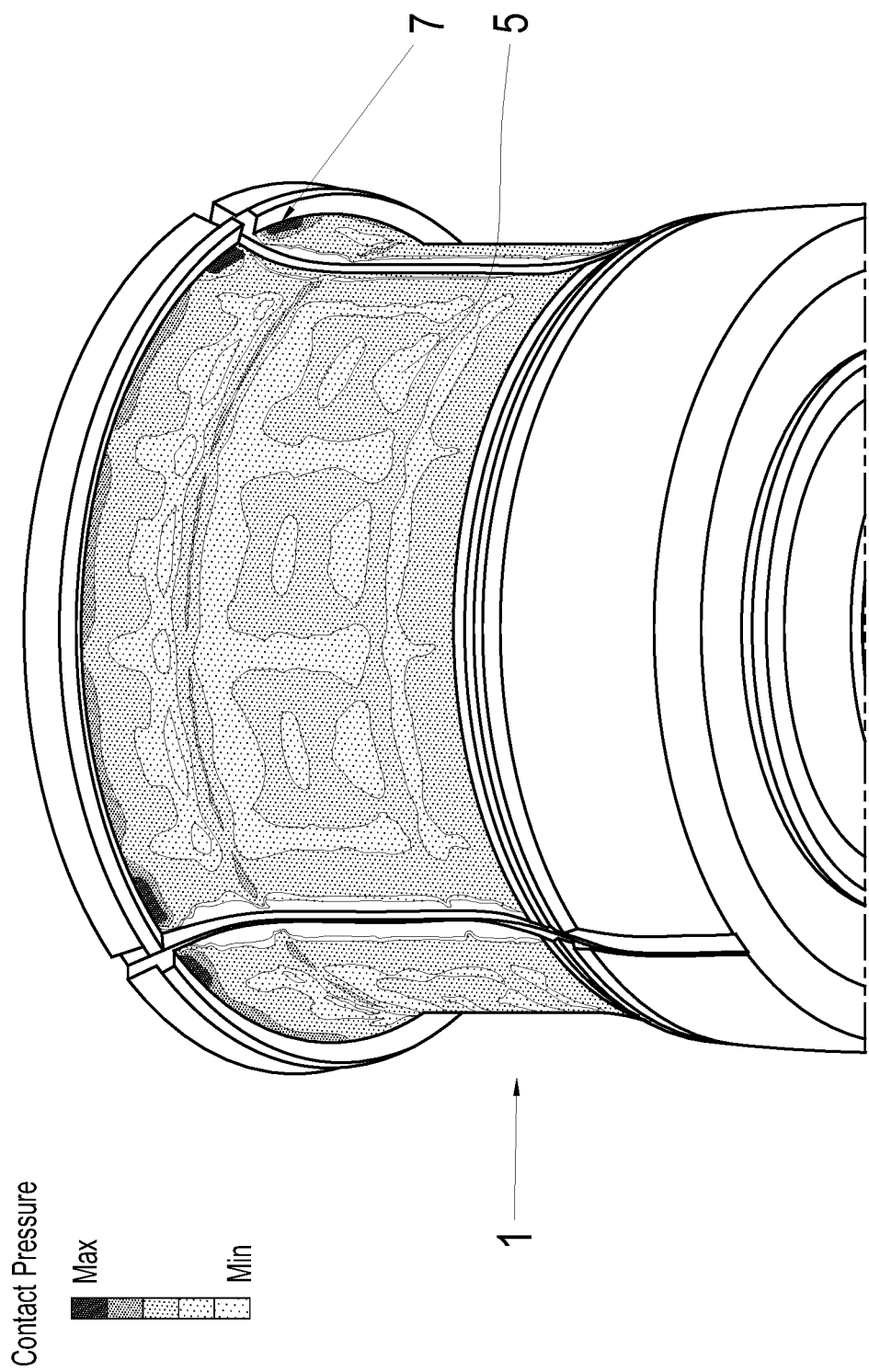
FIG. 2: A perspective representation of the rotor carrier of FIG. 1 without the rotor lamination stack.

FIG. 2 shows that the contact pressure in the bearing area is not constant, but it has different local values. This is in particular due to locally different rigidities of the rotor carrier 1. Thus, in two axial end sections 6, 7 of the bearing area 5 of the rotor carrier 1, the thickness of the material is greater than in a central section 8 formed by the bearing area 5, which extends in the axial direction x of the rotor carrier 1 between the said end sections 6 and 7. These locally different material thicknesses have the result that in the end sections 6, 7 of the bearing area 5, the rotor carrier 1 is more rigid than it is in the central section 8.

FIG. 1 shows that due to the contact pressure of the rotor lamination stack 4, the rotor carrier 1 and the rotor lamination stack 4 are deformed. The deformation is not constant, but locally very different. Thus, in the less rigid central section 8 of the rotor carrier 1 the deformation is greater than in the more rigid end sections 6, 7. In the axial end areas the rotor lamination stack 4 is deformed more than it is in a central axial area. In this case an oil baffle plate, which in the example embodiment shown in FIG. 1 is arranged in the area of an axial end of the rotor lamination stack 4, can also be substantially deformed. FIG. 1 shows the rotor 2 in a greatly overextended condition at the maximum rotation speed, in order to illustrate the deformation more clearly. These deformations are brought about by different contact pressures between the rotor carrier 1 and the rotor lamination stack 4. FIG. 2 shows the locally differently high contact pressures within the bearing area 5 of the rotor carrier 1, wherein in particular, the contact pressure is particularly high in the area of one of the end sections 7.

Figure 3:
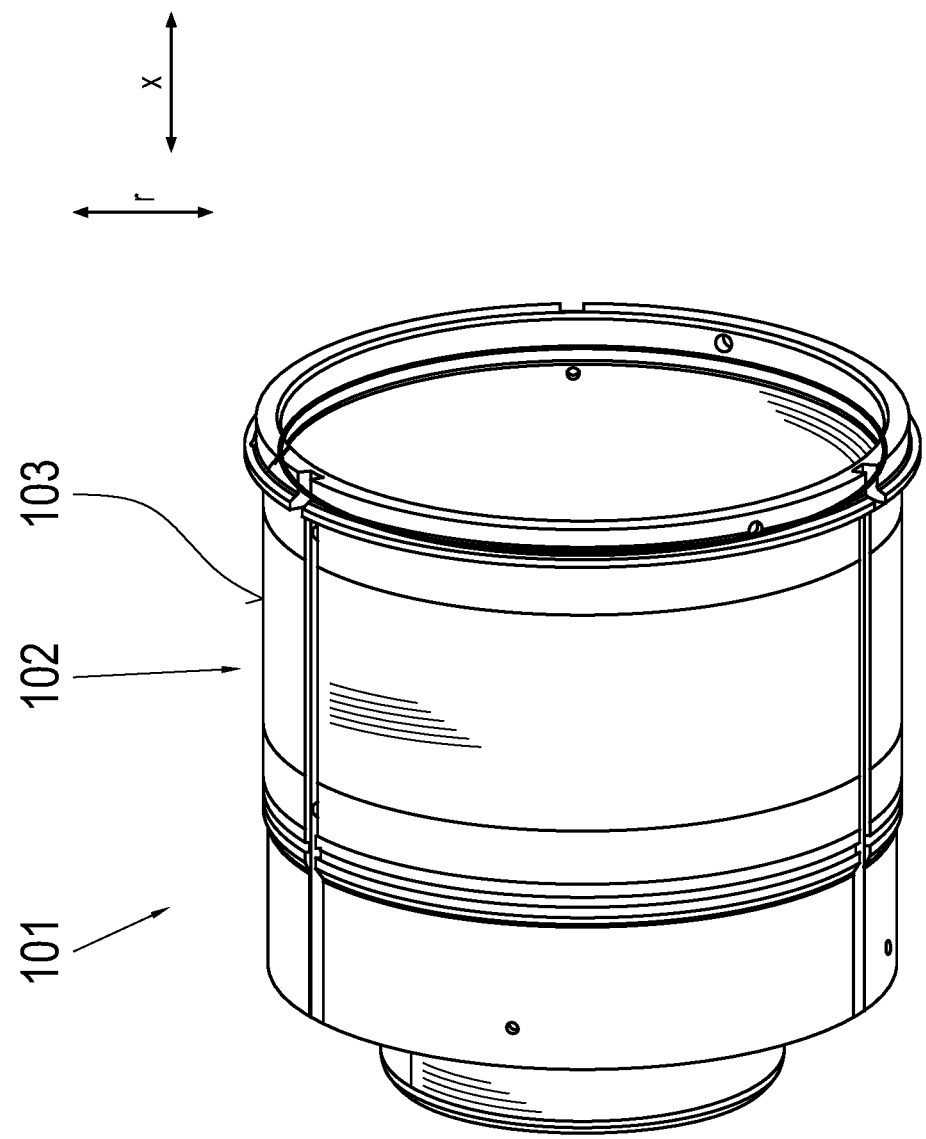
FIG. 3: A perspective representation of a rotor carrier with a bearing area, according to an example embodiment of the present invention.
Figure 4:
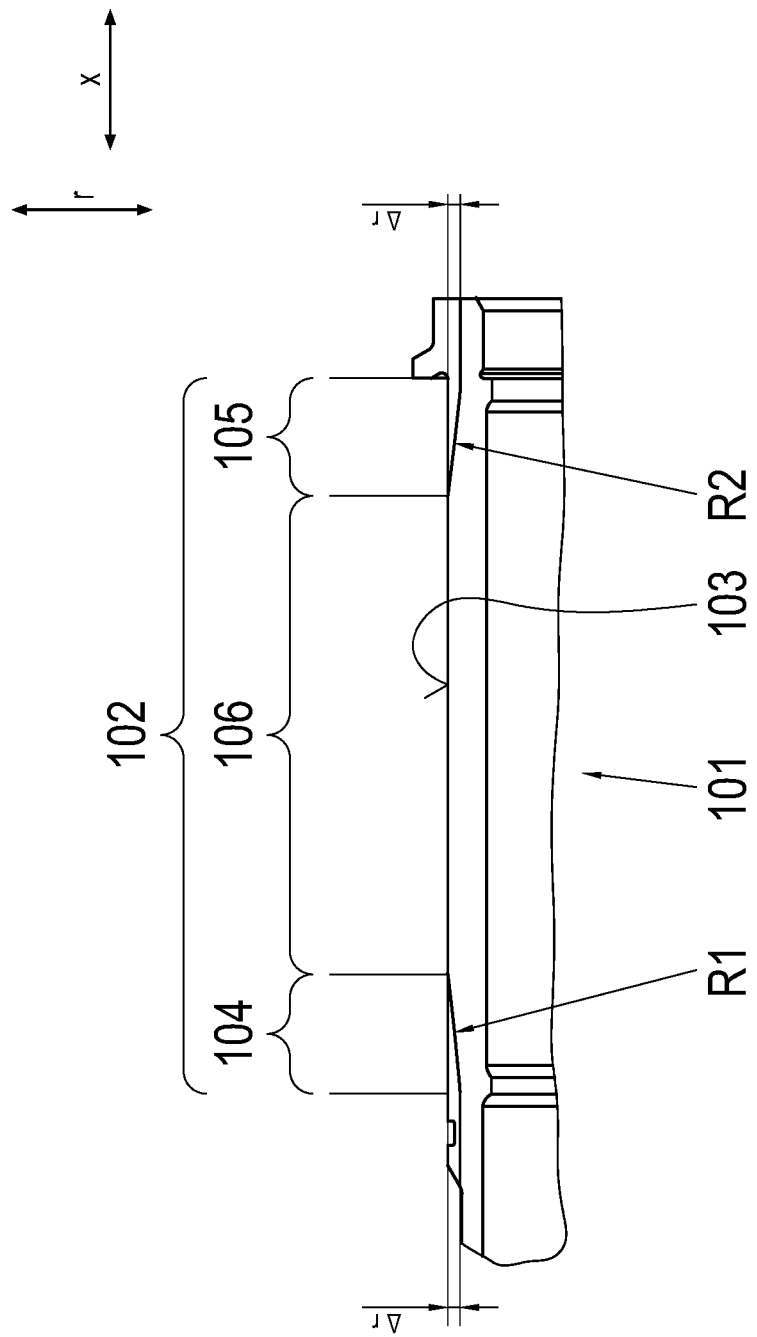
FIG. 4: An enlarged detail view of the bearing area of the rotor carrier according to FIG. 3, with exaggeratedly represented cambering or convexity of the bearing area.
Figure 5:
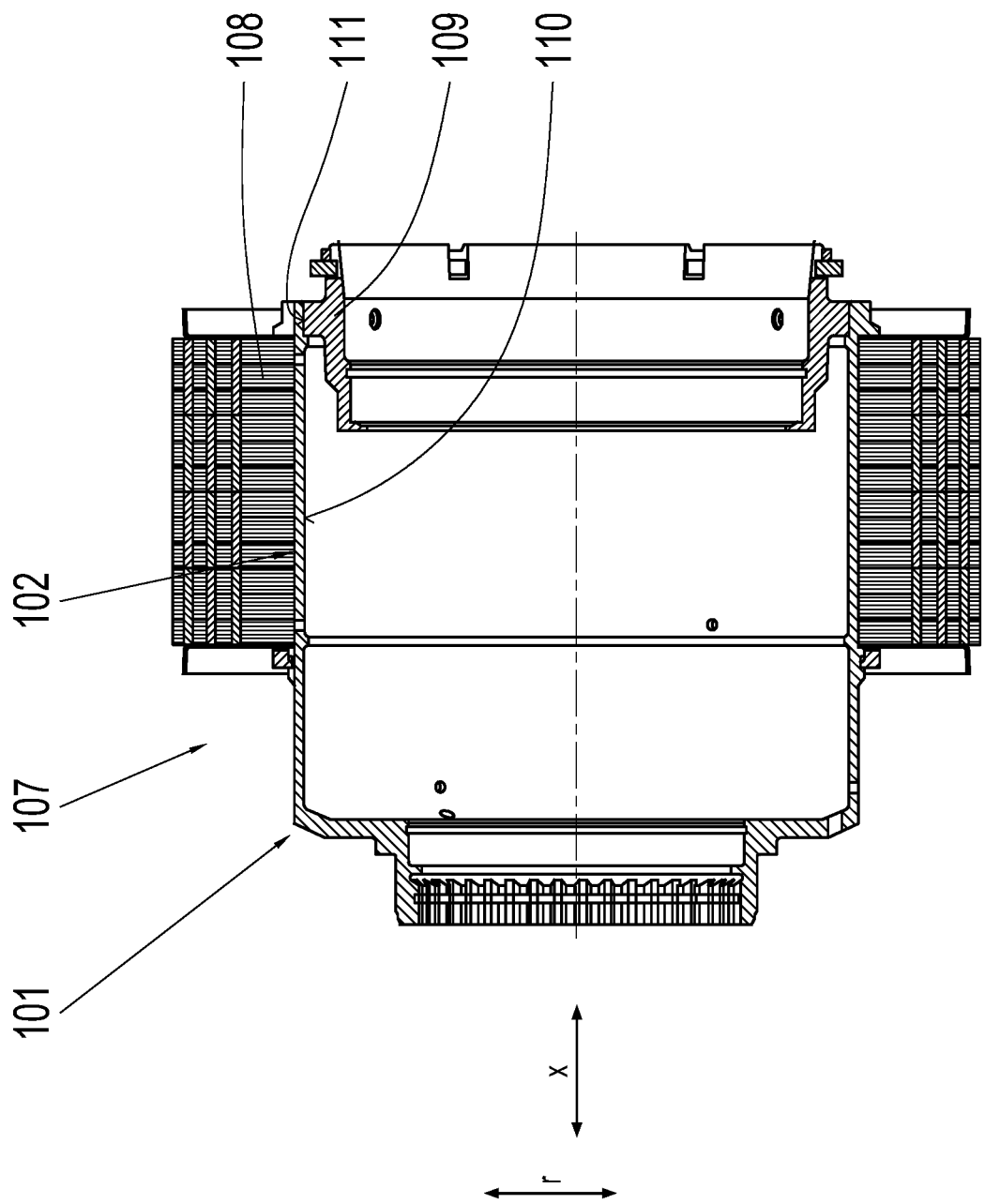
FIG. 5: A longitudinal sectioned representation of the rotor carrier in FIG. 3, with a rotor lamination stack pressed against the rotor carrier.

FIGS. 3 and 4 show a rotor carrier 101 of a rotor 107 shown in FIG. 5 for an electric machine (no more of which is shown). The electric machine can in particular be designed to be used in a drive-train of a motor vehicle and to drive the motor vehicle. The rotor carrier 101 is a component of hollow design whose main portion is essentially cylindrically shaped. The rotor carrier 101 can be rotated by means of a rotor shaft (not shown). In the area of an axial end of the rotor carrier 101 a bearing plate 109 projects a short distance into the rotor carrier 101. In this case an inner shell surface 110 of the rotor carrier 101 is pressed against an outer lateral shell 111 of the bearing plate 109, so that the rotor carrier 101 and the bearing plate 109 are frictionally connected with one another in a rotationally fixed manner.

The rotor carrier 101 is designed to accommodate a rotor lamination stack 108 shown in FIG. 5, which surrounds the rotor carrier 101 in a radial direction r of the rotor carrier 101. The rotor lamination stack 108 can be regarded as an external component comprising a cylinder containing laminae which are thin-walled in the axial direction x of the rotor carrier 101 and are stacked one above another in the axial direction x. Compared with the rotor lamination stack 108 the rotor carrier 101 consists of an inner portion which is thin-walled in the radial direction r. To accommodate the rotor lamination stack 108, the rotor carrier 101 has a bearing area 102. The bearing area 102 is formed or constituted by an outer lateral shell 103 of the rotor carrier 101. The rotor lamination stack 108 is pressed against the bearing area 102, so that the rotor lamination stack 108 is held by friction onto the outer surface 103 of the rotor carrier 101 in order to transmit a torque between the rotor carrier 101 and the rotor lamination stack 108. The pressing of the rotor lamination stack 108 against the bearing area 102 of the rotor carrier 101 results in contact pressures which act upon the rotor carrier 101 and the rotor lamination stack 108 within the bearing area 102.

The bearing area 102 extends in an axial direction x of the rotor carrier 101 and in the example embodiment illustrated, has a first axial end section 104, a central section 106 and a second axial end section 105 between the axial end sections. The first end section 104 and the second axial end section 105 delimit the bearing area 106 in the axial direction x of the rotor carrier 101. The central section 106 of the bearing area 102 extends in the axial direction x between the two end sections 104, 105. In the example embodiment shown, the first axial end section 104 and the second end section 105 each extend 20 mm in the axial direction x of the rotor carrier 101. The central section 106 extends 80 mm in the axial direction x of the rotor carrier 101.

In the bearing area 102 the rotor carrier 101 is cambered. In the example embodiment shown, the rotor carrier 101 is made locally with different thicknesses in the radial direction r. Along the axial direction x the thickness of the outer lateral shell 103 increases starting from the first end section 104 toward the central section 106, remaining constant in the latter, and then decreasing again toward the second end section 105. In this case the radial extension of the outer lateral shell 103 increases starting from the first axial end section 104 along a first radius R1 toward the central section 106. From the other axial side the radial extension of the outer lateral shell 103 increases mirror-symmetrically starting from the second axial end section 105 along a second radius R2 toward the central section 106. In the example embodiment shown, the radial extension of the outer lateral shell 103 of the rotor carrier 101 can be larger in the central section 106 by a difference Δr of 0.02 mm than it is in the first axial end section 104 and in the second axial end section 105. The first radius R1 and the second radius R2 can in this case, for example, be 10,000 mm long.

In this way the extension of the outer lateral shell 103 in the radial direction r of the rotor carrier 101 varies along the bearing area 102 in the axial direction x in such manner that in the axial end sections 104, 105 of the bearing area 102 no peak values of the contact pressure between the rotor carrier 101 and the rotor lamination stack 108 occur when the rotor lamination stack 108 is pressed against the bearing area 102 of the rotor carrier 101, as shown in FIG. 5. In the example embodiment shown, the radial shape of the outer lateral shell 103 along the axial direction x is chosen such that the value of the contact pressure within the bearing area 102 along the axial direction x is constant when the rotor lamination stack 108 is pressed against the rotor carrier 101 within the bearing area 102 and when the rotor carrier 101 is rotating at a specified operational rotation speed.

INDEXES

Δr Radial extension difference
r Radial direction
R1 First radius
R2 Second radius
x Axial direction

1 Rotor carrier
2 Rotor
3 Bearing plate
4 Rotor lamination stack
5 Bearing area
6 Axial end section of the bearing area
7 Axial end section of the bearing area
8 Central section of the bearing area
9 Oil baffle plate
101 Rotor carrier
102 Bearing area
103 Outer lateral shell
104 Axial end section of the bearing area
105 Axial end section of the bearing area
106 Central section of the bearing area
107 Rotor
108 Rotor lamination stack
109 Bearing plate
110 Inner shell surface of the rotor carrier
111 Outer lateral surface of the bearing plate

The invention claimed is:

1. A rotor carrier, for a rotor of an electric machine, for rotation with a shaft, wherein:
   the rotor carrier has a hollow, generally cylindrical geometry that extends along a central axis;
   the rotor carrier includes an outer shell that extends in an axial direction along the central axis and includes a first axial end section, a second axial end section, and a central section arranged between the first axial end section and the second axial end section;
   the rotor carrier defines a bearing area for supporting a rotor lamination stack of the rotor;
   a first end of an inner surface of the rotor carrier engaging with a bearing plate so that the rotor carrier and the bearing plate are frictionally connected with one another while an opposite end of the rotor carrier is bent radially inward, and the bearing area is located therebetween; and
   a radial dimension of the outer shell varies along the bearing area in the axial direction of the rotor carrier such that when the rotor lamination stack is pressed against the bearing area of the rotor carrier, no peaks in contact pressure occur between the rotor carrier and the rotor lamination stack.

2. The rotor carrier according to claim 1, wherein the first and second axial end sections include a reduced radial dimension compared to the central section.

3. The rotor carrier according to claim 1, wherein the radial dimension of the outer shell varies in such a manner that within the bearing area a profile of the contact pressure along the axial direction is constant between the rotor lamination stack and the rotor carrier when the rotor carrier is rotating at a specified operational rotation speed.

4. The rotor carrier according to claim 1, wherein the bearing area is cambered.

5. The rotor carrier according to claim 1, further comprising the rotor lamination stack is configured to be pressed against the bearing area.

6. The rotor carrier according to claim 1, wherein the radial dimension along the central section is greater than the radial dimension along the first axial end section and along the second axial end section.

7. The rotor carrier according to claim 6, wherein
   the radial dimension of the outer shell increases along the first axial end section toward the central section, and
   the radial dimension of the outer shell increases along the second axial end section toward the central section.

8. The rotor carrier according to claim 7, wherein the radial dimension of the outer shell, in the central section, is up to 1 mm greater than the radial dimension in at least one of the first axial end section and the second axial end section.

9. The rotor carrier according to claim 7, wherein the radial dimension of the outer shell in the central section is up to 0.1 mm greater than the radial dimension in at least one of the first axial end section and the second axial end section.

10. The rotor carrier according to claim 7, wherein the radial dimension of the outer shell in the central section is 0.02 mm greater than the radial dimension in the first axial end section and the radial dimension in the second axial end section.

11. The rotor carrier according to claim 10, wherein the first axial end section and the second axial end section each extend 20 mm in the axial direction of the rotor carrier.

12. The rotor carrier according to claim 11, wherein the central section extends 80 mm in the axial direction of the rotor carrier.

13. A rotor, for an electric machine, for rotation with a shaft, the rotor comprising:
   a rotor carrier having a hollow, generally cylindrical geometry that extends along a central axis, wherein
   the rotor carrier includes an outer shell that extends axially and includes a first axial end section, a second axial end section, and a central section arranged between the first axial end section and the second axial end section;
   the rotor carrier defines a bearing area for a rotor lamination stack;
   a radial dimension of the outer shell varies along the bearing area in the axial direction of the rotor carrier; and
   the rotor lamination stack supported along the bearing area,
   wherein
   a first end of an inner surface of the rotor carrier engaging with a bearing plate so that the rotor carrier and the bearing plate are frictionally connected with one another while an opposite end of the rotor carrier is bent radially inward, and the bearing area is located therebetween, and,
   in the bearing area of the rotor carrier, the rotor lamination stack is pressed against the outer shell of the rotor carrier such that no peaks in contact pressure occurs between the rotor carrier and the rotor lamination stack in the bearing area.

14. The rotor according to claim 13, wherein the radial dimension along the central section is greater than the radial dimension along the first axial end section and along the second axial end section.

15. The rotor according to claim 14, wherein the bearing area is cambered.

16. The rotor according to claim 13, wherein the radial dimension of the outer shell varies in such a manner that within the bearing area a profile of the contact pressure along the axial direction is constant between the rotor lamination stack and the rotor carrier when the rotor carrier is rotating at a specified operational rotation speed.

17. The rotor according to claim 16, wherein
   the radial dimension of the outer shell increases along the first axial end section toward the central section, and
   the radial dimension of the outer shell increases along the second axial end section toward the central section.

18. The rotor according to claim 13, wherein the radial dimension of the outer shell in the central section is up to 0.1 mm greater than the radial dimension in at least one of the first axial end section and the second axial end section.

19. The rotor according to claim 13, wherein the radial dimension of the outer shell in the central section is 0.02 mm greater than the radial dimension in the first axial end section and the radial dimension in the second axial end section.

20. A rotor, for an electric machine, to be rotated with a rotor shaft, the rotor comprising:
   a rotor carrier having a hollow, generally cylindrical geometry that extends along a central axis and surrounds the rotor shaft, wherein
   the rotor carrier including an outer shell that extends axially and includes a first axial end section, a second axial end section, and a central section, arranged between the first axial end section and the second axial end section;
   an exterior surface of the rotor carrier defining a bearing area for supporting a rotor lamination stack; and
   a radial dimension of the outer shell varies along the bearing area in the axial direction of the rotor carrier; and
   the rotor lamination stack being supported along the bearing area,
   wherein, in the bearing area of the rotor carrier, the rotor lamination stack is pressed against the outer shell of the rotor carrier, such that no peaks occur in contact pressure occurs between the rotor carrier and the rotor lamination stack in the bearing area;
   a first end of an inner surface of the rotor carrier engaging with a bearing plate so that the rotor carrier and the bearing plate are frictionally connected with one another while an opposite end of the rotor carrier is bent radially inward, and the bearing area is located therebetween;
   the first axial end section and the second axial end section are both radiused, and
   the radial dimension of the outer shell in the central section is up to 1 mm greater than the radial dimension in at least one of the first axial end section and in the second axial end section.

\* \* \* \* \*